US006645673B2

(12) United States Patent
Yamawaki et al.

(10) Patent No.: US 6,645,673 B2
(45) Date of Patent: *Nov. 11, 2003

(54) PROCESS FOR PRODUCING LITHIUM TITANATE AND LITHIUM ION BATTERY AND NEGATIVE ELECTRODE THEREIN

(75) Inventors: Tetsuya Yamawaki, Chigasaki (JP); Kiyoshi Eto, Chigasaki (JP); Hideki Sakai, Chigasaki (JP)

(73) Assignee: Toho Titanium Co., Ltd., Chigasaki (JP)

( * ) Notice: Subject to any disclaimer, the term of this patent is extended or adjusted under 35 U.S.C. 154(b) by 162 days.

This patent is subject to a terminal disclaimer.

(21) Appl. No.: 09/768,269

(22) Filed: Jan. 25, 2001

(65) Prior Publication Data

US 2001/0031401 A1 Oct. 18, 2001

Related U.S. Application Data

(63) Continuation-in-part of application No. 09/501,662, filed on Feb. 10, 2000, now Pat. No. 6,475,673.

(30) Foreign Application Priority Data

| Feb. 16, 1999 | (JP) | ............................................. 11-37275 |
| Jan. 26, 2000 | (JP) | ........................................... 2000-17090 |
| Jan. 26, 2000 | (JP) | ......................................... 2000-017499 |
| Jan. 26, 2000 | (JP) | ......................................... 2000-017641 |

(51) Int. Cl.[7] ........................... C01G 23/00; H01M 4/58
(52) U.S. Cl. ................. 429/231.5; 423/598; 429/218.1; 429/231.95
(58) Field of Search ....................... 423/598; 429/218.1, 429/231.5, 231.95

(56) References Cited

U.S. PATENT DOCUMENTS 5,312,582 A * 5/1994 Donado ........................ 419/19
6,120,938 A * 9/2000 Atsumi et al. ............ 429/231.1
6,475,673 B1 * 11/2002 Yamawaki et al. ....... 429/231.5

FOREIGN PATENT DOCUMENTS

JP          A-9-30972          2/1997

OTHER PUBLICATIONS

D.C. Johnson, *Superconducting and Normal State Properties of $Li_{1+x}Ti_{2-x}O_4$ Spinel Compounds. I. Preparation, Crystallography, Superconducting Properties, Electrical Resistivity, Dielectric Behavior, and Magnetic Susceptibility*, Journal of Low Temperature Physics, vol. 25, No. 1/2, pp. 145–175, 1976.

* cited by examiner

Primary Examiner—Stanley S. Silverman
Assistant Examiner—Jonas N. Strickland
(74) Attorney, Agent, or Firm—Oliff & Berridge, PLC

(57) ABSTRACT

In a process for producing lithium titanate, a mixture of titanium dioxide and at least one lithium compound selected from the group consisting of lithium carbonate, lithium hydroxide, lithium nitrate, and lithium oxide is presintered at a temperature of between 670° C. or more and less than 800° C. to prepare a compound consisting of $TiO_2$ and $Li_2TiO_3$ or a compound consisting of $TiO_2$, $Li_2TiO_3$ and $Li_4Ti_5O_{12}$. The compound is then sintered at a temperature in the range of 800 to 950° C.

22 Claims, No Drawings

PROCESS FOR PRODUCING LITHIUM TITANATE AND LITHIUM ION BATTERY AND NEGATIVE ELECTRODE THEREIN

CROSS-REFERENCES TO RELATED APPLICATIONS

This is a continuation-in-part application of U.S. patent application Ser. No. 09/501,662, now U.S. Pat. No. 6,475,673 B1 filed on Feb. 10, 2000.

BACKGROUND OF THE INVENTION

1. Technical Field

The present invention relates to a process for producing lithium titanate which is suitable for electrodes for lithium ion batteries used, for example, as backup power supplies for personal computers and for portable types of equipment and the like, and to lithium ion batteries using the same.

2. Background Art

The recent rapid development of technology in the field of electronics has allowed compact design and weight reduction in electronic equipment. Secondary batteries as driving or backup power supplies for this equipment are strongly required to be of compact design and light weight, and to have high energy density. Recently, development of larger electricity storage systems are also urgently required for electric automobiles and off-peak domestic electricity storage systems in order to reduce $CO_2$ emissions. As new types of secondary batteries which can meet these requirements, secondary lithium batteries which have high energy density to volume have attracted attention.

Lithium titanate, presented by the formula, $Li_4Ti_5O_{12}$ (termed $Li_{4/3}Ti_{5/3}O_4$ below), is used as a material for secondary lithium batteries. As processes for production of these compounds, wet methods and dry methods are known (for example, unexamined published Japanese Patent Application, No. 309727/97, and Journal of Low Temperature Physics, Vol. 25, p. 145, 1976). Although wet methods can produce lithium titanate having good crystallinity, these methods require complicated processes, waste water treatment and the like, which poses problems of economic efficiency. To contrast, although the conventional dry methods are simple in process, lithium titanate by-products with formulas other than the above are produced. Furthermore, control of the atomic ratio of titanium and lithium (hereinafter referred to as the Li/Ti ratio) is difficult due to vaporization loss of elemental lithium and lithium compounds, and titanium dioxide as a raw material remains in the products. As a result, the method poses problem in that lithium titanate, $Li_4Ti_5O_{12}$, cannot be efficiently produced.

SUMMARY OF THE INVENTION

The present invention was made to solve the above-mentioned problems. Objects of the invention follow.

(1) Providing a production process for efficiently producing lithium titanate using a dry method.

(2) Providing a process for producing lithium titanate, in which vaporization loss of lithium compounds in the sintering reaction can be suppressed, so that the Li/Ti ratio can be freely controlled in the range of 0.78 to 0.82 (i.e., around 0.80), and preferably in the range of 0.79 to 0.80.

(3) Providing a process for producing lithium titanate, in which persistence of titanium dioxide as a raw material can be suppressed.

According to research by the inventors, it was discovered that vaporization loss of lithium compounds can be extremely decreased, the Li/Ti ratio can be easily controlled, titanium dioxide as a raw material did not remain, and therefore lithium titanate compounds can be efficiently produced by employing a process in which specific sintering conditions are combined.

The invention was completed based on the above research. The invention provides a process for producing lithium titanate by presintering a mixture of titanium dioxide and at least one lithium compound selected from the group consisting of lithium carbonate, lithium hydroxide, lithium nitrate, and lithium oxide to prepare at least one of a composition comprising $TiO_2$ and $Li_2TiO_3$ and a composition comprising $TiO_2$, $Li_2TiO_3$ and $Li_4Ti_5O_{12}$, and sintering the composition.

The method according to the invention will be explained in detail hereinafter.

DETAILED DESCRIPTION OF THE INVENTION

The lithium titanate produced by the invention is represented by the general formula $Li_XTi_YO_{12}$, in which the Li/Ti ratio is in the range of 0.78 to 0.82, X is in the range of 3 to 5, and Y is in the range of 4 to 6. In particular, the invention is directed to single phase lithium titanate with a spinel crystal structure presented by $Li_4Ti_5O_{12}$, or a mixture or mixed crystal structure of $Li_4Ti_5O_{12}$, $Li_2TiO_3$, and $TiO_2$.

1. Raw Materials

The lithium compounds as raw materials for the invention are one or more lithium compounds selected from the group consisting of lithium carbonate, lithium hydroxide, lithium nitrate, and lithium oxide. Among these compounds, lithium carbonate and lithium hydroxide are preferably used. These lithium compounds used as materials preferably have high purity, normally of 99.0 weight % or more. For example, when lithium hydroxide is used as a raw material, $Li_2CO_3$ is preferably included at 99.0 weight % or more, and is more preferably 99.5 weight % or more; the content of Na, Ca, and Mg, etc., as impurities, is preferably 100 ppm or less, and is more preferably 10 ppm or less; and the content of Cl and $SO_4$ is preferably 100 ppm or less, and is more preferably 50 ppm or less. The water component should be sufficiently removed, and the content thereof is preferably 0.1 weight % or less. Moreover, the average particle size is preferably in the range of 0.01 to 100 $\mu$m, and in the case of lithium hydroxide, the particle size is preferably in the range of 1 to 50 $\mu$m, and is more preferably in the range of 5 to 20 $\mu$m.

With respect to titanium dioxide ($TiO_2$), it should also have high purity. In particular, the purity is preferably 99.0 weight % or more, and is more preferably 99.5 weight % or more; the content of Fe, Al, Si, and Na included in fine particles of titanium dioxide as impurities is preferably less than 20 ppm respectively; and the content of Cl is preferably less than 200 ppm. More preferably, the content of Fe, Al, Si, and Na included in fine particles of titanium dioxide are less than 10 ppm, respectively; and the content of Cl is less than 100 ppm, and is more preferably less than 50 ppm. The average particle size is preferably in the range of 0.05 to 30 $\mu$m, and is more preferably in the range of 0.1 to 10 $\mu$m.

2. Preparation of Materials for Presintering

Lithium titanate and titanium dioxide as materials for presintering are sufficiently mixed, and are provided for presintering. The mixing ratio of the materials may be chosen to coincide with the value of the Li/Ti ratio of the lithium titanate in the desired final compound product. The term "Li/Ti ratio" refers to the atomic ratio unless otherwise specified. For example, when the Li/Ti ratio of the desired product is 0.78 or 0.80, the materials are mixed in a proportion of 0.78 or 0.80. In this case, a crushing mixer such as a vibrating mill or a ball mill, a mixer with an agitator, a rotating mixer, or the like is used. The moisture absorption during mixing should be monitored. The mixing is preferably performed in dry air with an absolute humidity of 5 g/m$^3$ or less in air; alternatively, it may be performed in an inert gas. The mixture of the raw materials is provided to a presintering process in a powder state or as a green compact which is formed by compression at a pressure of 0.5 ton/cm$^2$.

In this case, it is also a preferable aspect of the present invention that the lithium compound solution be prepared by dissolving all or part of the lithium compound in solvent and drying, and a mixture solid is therefore obtained and is then pre-sintered. The lithium compound solution is a homogeneous solution in which all of the lithium compound is dissolved in solvent, or a solution in which part of the lithium compound is dissolved in solvent and the other part is suspended in the solvent. As a solvent, optional solvents can be employed if the lithium compound can be dissolved, and water, alcohols, or mixtures of these, can be mentioned and in particular, water is preferred. Ratios of lithium compound to solvent are different depending on solubility of the lithium compound used to the solvent, and when water is used as a solvent, the amount of the solvent per 1 g of lithium compound is usually 1 ml or more, and is preferably 5 ml or more. The temperature for preparing the above lithium compound solution is not limited and in particular, the temperature is preferably room temperature to 100° C., and is more preferably 50 to 80° C., from the viewpoint of the acceleration of the dissolution.

In this aspect, the lithium compound solution and titanium dioxide can be mixed by the above mixing method. The mixing method may be performed by mixing solvent, lithium compound, and titanium dioxide; by bringing into contact therewith, the lithium compound is dissolved into the solvent, and the lithium compound solution is thereby prepared and is mixed with the titanium dioxide at the same time. In the above mixing, solvents other than the solvent used in the lithium compound solution can be used, and for example, alcohols such as methanol, ethanol, 2-ethylhexanol, etc., saturated hydrocarbons such as hexane, heptane, cyclohexane, etc., aromatic hydrocarbons such as benzene, toluene, xylene, ethylbenzene, etc., halogenated hydrocarbons such as o-dichlorobenzene, dichloromethane, tetrachloromethane, dichloroethane, etc., acetone, ethers, acetonitrile, tetrahydrofuran, etc., can be employed.

As described above, the lithium compound solution is mixed with titanium dioxide and is dried, and the mixture solid is therefore prepared. At this time, by evaporating the solvent, adding alcohols in which lithium compound is not dissolved, or replacing such solvent, the dissolved lithium compound is crystallized. Then, total solids in the solvent are dried, and the mixture solid of lithium compound and titanium dioxide is therefore obtained. Thus, in the wet-type mixing method as described above, since all or part of the lithium compound is dissolved and mixed with titanium dioxide, the lithium compound and the titanium dioxide are uniformly and finely dispersed, and reactivity thereof in presintering and sintering is made superior. As the result, lithium titanate, which has superior characteristics in batteries, can be obtained.

3. Presintering Process

In the invention, first, the mixture of raw materials is presintered under the conditions indicated below. That is, the mixture of the raw materials is heated and sintered in an oxidizing atmosphere at a temperature in the range of 600 to 800° C., preferably in the range of 670 to 800° C., and more preferably in the range of 700 to 780° C. The duration of the heating and presintering is adequate at 30 minutes to 4 hours. The rate at which the temperature is increased is adequate in the range of 0.5 to 10° C./min. By this presintering process, a presintered product (hereinafter referred to as the "intermediate product") is obtained.

The chemical composition of the intermediate product is two components substantially consisting of $TiO_2$ and $Li_2TiO_3$, or three components substantially consisting of $TiO_2$, $Li_2TiO_3$, and $Li_4Ti_5O_{12}$. The chemical composition of the intermediate product may be specified by a chart obtained by an X-ray powder diffraction analysis. In the chart, $Li_2TiO_3$ is specified at 43.4°, $Li_4Ti_5O_{12}$ is specified at 18° and 43°, and $TiO_2$ (rutile type) is specified at 27°, and the presence of these is determined. Also the presence of the raw material, for example, $Li_2CO_3$, is determined according to detection of a peak at 31.5°. Thus, in the invention, the presence of the intermediate products and the raw materials is determined by whether or not these compounds are detected by the X-ray powder diffraction analysis. Therefore, the invention does not exclude cases in which components other than the above components are not detected by the X-ray powder diffraction analysis. In cases in which the relative intensity of the peak is less than 1 when the peak exhibiting the maximum intensity among plural detected peaks is defined as 100, it is determined that the component is not detected by the X-ray powder diffraction analysis.

According to the basic concept of the invention, it is important that the lithium compounds in the raw material be entirely converted to intermediate products after the presintering process and that a part of $TiO_2$ as a raw material remain.

As a heating atmosphere for presintering, an oxidizing atmosphere is preferable such as oxygen gas, oxygen-containing gas, etc., or an atmosphere in which the partial pressure of oxygen gas is preferably 0.1 Pa or less, is more preferably 0.5 Pa or less, and is most preferably 1 Pa or less. In the present invention, it is one of the preferable aspects that presintering be carried out in the latter atmosphere in which the partial pressure of oxygen gas is 0.1 Pa or less and the amount of oxygen gas is very small, as well as sintering as described below, and lithium titanate in which discharge capacity is high and charge-discharge cycle property is highly superior when it is used as a negative electrode in a lithium ion battery, can be thereby produced. The atmosphere in which the partial pressure of oxygen gas is 1 Pa or less refers to a vacuum, an inert gas atmosphere such as nitrogen or argon, or a reducing gas atmosphere such as hydrogen gas, etc.

4. Sintering Process

In the invention, the intermediate product produced by the presintering process is subjected to a sintering process. In the sintering process, the intermediate product is heated to a temperature in the range of 800 to 950° C., and preferably to a temperature in the range of 820 to 950° C., more preferably to a temperature in the range of 850 to 930° C. without removing the intermediate product from the furnace. Alternatively, the compact is removed from the furnace, and is crushed and mixed to again form a compact, and is then heated to a temperature for the sintering process. When the temperature for the sintering process is less than 800° C., $TiO_2$ does not sufficiently react, and tends to remain in the final desired product, lithium titanate such as $Li_4Ti_5O_{12}$. When the temperature for the sintering process exceeds 950° C., the chemical composition of $Li_4Ti_5O_{12}$ is converted into other compounds, and therefore it is difficult to obtain the desired Li/Ti ratio of 0.78 to 0.82. The temperature for the sintering process is set to be a temperature higher than that of the presintering process.

The sintering process can be performed in an oxidizing atmosphere, and the sintering duration may be set in the range of 30 minutes to 10 hours. The temperature and the duration for the sintering process is preferably chosen based on the subsequent residual amount of $TiO_2$. That is, the sintering process is performed so that the proportion of the intensity at the X-ray powder diffraction peak (27°) of $TiO_2$ in the product after the sintering process with respect to the intensity at the X-ray powder diffraction peak (18°) of $Li_4Ti_5O_{12}$, which is a relative intensity ratio (referred to as the "$TiO_2$ residual degree") and is 0.1 or less, preferably 0.05 or less, and more preferably 0.02 or less. The lithium titanate with such properties exhibit desirable battery properties when used in, for example, secondary lithium batteries.

In a preferable aspect according to the present invention, an intermediate product is sintered in an atmosphere in which the partial pressure of oxygen gas is 1 Pa or less, is preferably 0.5 Pa or less, and is more preferably 0.5 Pa or less. The atmosphere in which the partial pressure of oxygen gas is 1 Pa or less refers to a vacuum, an inert gas atmosphere such as nitrogen or argon, or a reducing gas atmosphere such as hydrogen gas, etc., and the atmosphere is preferably an inert gas atmosphere in which the partial pressure of oxygen gas is 1 Pa or less and is more preferably a nitrogen gas atmosphere in which the partial pressure of oxygen gas is 1 Pa or less. Thus, by sintering in an atmosphere in which the amount of oxygen gas is very small, lithium titanate in which discharge capacity is high and charge-discharge cycle property is highly superior can be produced, when it is ultimately used as a negative electrode or a positive electrode of a lithium ion battery.

The thus-obtained lithium titanate is removed from the sintering furnace and is subjected to suitable processes such as crushing, classification, and screening in a dry atmosphere, and the desired lithium titanate compound is thereby produced. The average particle size of lithium titanate is in the range of 0.1 to 15 μm, preferably in the range of 0.3 to 10 μm, and is more preferably in the range of 0.5 to 5 μm.

As explained above, the invention is characterized in that the raw material, lithium compounds, and titanium dioxide, are selectively converted to the specific compositions in the presintering process, and lithium titanate having a Li/Ti ratio (atomic ratio) in the range of 0.78 to 0.82 is produced in the subsequent sintering process. The conventional processes require larger amounts of raw material in consideration of vaporization losses of the lithium components in the sintering process, so that the Li/Ti ratio is not easily controlled and is not uniform. In contrast, the invention can solve these problems.

Preferred embodiments of the invention are described below.

(1) The combination of the temperatures for the presintering process in the range of 650 to 800° C. and for the sintering process in the range of 800 to 950° C. is employed.

(2) The combination of the temperatures for the presintering process in the range of 670 to 780° C. and for the sintering process in the range of 820 to 900° C. is employed.

(3) The presintering process produces two components substantially consisting of $Li_2TiO_3$ and $TiO_2$, or three components substantially consisting of $Li_2TiO_3$, $Li_4Ti_5O_{12}$, and $TiO_2$.

(4) The $TiO_2$ residual degree is 0.1 or less.

The invention also provides a negative electrode produced from the above lithium titanate for a lithium ion battery. The electrode for the lithium titanate ion battery is produced by optionally adding electrode combination agents such as conductive agents and binders to the lithium titanate of the invention. In particular, it is possible to use conductive materials such as graphite, carbon black, acetylene black, Ketjen Black, carbon fiber, metallic powders such as those of copper, nickel, aluminum, silver, metal fiber, or polyphenylene derivatives. It is possible to use polysaccharides, thermoplastic resins, and elastic polymers, etc., as binders. Specifically, starch, polyvinyl alcohol, reconstituted cellulose, polyvinyl chlorides, polyfluorinated vinylidene, polyethylene, polypropylene, ethylene-propylene rubber, etc., can be used. A filler such as polypropylene or polyethylene can be added in addition to the above.

In addition, the invention provides a lithium ion battery using a negative electrode comprising the above lithium titanate. The lithium ion battery is composed of the negative electrode, a positive electrode, and electrolyte. Materials for the positive electrode are not limited, and well known materials can be used therein. For example, it is possible to use lithium manganate, lithium cobaltate, lithium nickelate, nickel inclusion lithium cobaltate, vanadium pentoxides, etc. The electrolyte used therefor is composed of a lithium salt and a solvent. Solvents such as propylene carbonate, ethylene carbonate, butylene carbonate, dimethyl carbonate, diethyl carbonate, γ-butyrolactone, methyl formate, methyl acetate, 1,2-dimethoxyethane, tetrahydrofuran, 2-methyltetrahydrofuran, dimethylsulfoxide, 1,3-dioxolane, formamide, dimethylformamide, dioxolane, acetonitrile, nitromethane, and ethylmonoglyme can be used as solvents. It is possible to use $LiPF_6$, $LiClO_4$, $LiCF_3SO_3$, $LiN(CF_3SO_2)_2$, and $LiBF_4$, etc. as the lithium salt. The lithium salt is dissolved in the solvent to form an electrolyte, and the lithium ion battery of the invention is constructed by combining the positive electrode and the negative electrode therein.

As mentioned above, the invention can efficiently provide lithium titanate having the desired composition by the specified production conditions, and therefore can provide a negative electrode and lithium ion battery exhibiting high discharge capacity and superior charging and discharging properties by using the lithium titanate in the negative electrode in a lithium ion battery.

The above are preferred embodiments. Other embodiments will be clear from further a reading of the specification.

EXAMPLES

1. First Embodiment

The invention is explained in more detail with reference to the examples hereinafter.

Sample No. 1-1

291.25 g of a titanium dioxide powder with a purity of 99.9% (produced by TOHO TITANIUM Co., Ltd., 90% of rutile rate) and 108.75 g of lithium carbonate with a purity of 99.0% (produced by WAKO JUNYAKU Co., Ltd.) were weighed in a glove box filled with air, and thus a raw material with a Li/Ti ratio of 0.80 was obtained. The average particle sizes of the powders were in the range of 0.1 to 10 $\mu$m.

Then, the titanium dioxide powder and the lithium carbonate powder were charged into a rocking mixer and were mixed for 2 hours therein. A 100 g portion was taken from the mixture of the powders and was charged into a titanium die with a diameter of 50 mm and was then compressed into a plurality of green compacts at a pressure of 0.5 ton/cm$^2$. Then, the green compacts were inserted into an aluminum reaction tube with a diameter of 10.5 cm and a length of 100 cm. The aluminum reaction tube was inserted into a heating furnace and the temperature therein was increased at a rate of 4° C./min, whereby a presintering process in which the temperature was maintained at 700° C. for 4.5 hours was performed. During this process, oxygen was supplied into the heating furnace at a flow rate in the range of 0.08 to 0.1 Nl/min.

The compacts, which were intermediate products produced in the presintering process, were removed from the heating furnace and were crushed into particles with particle sizes in the range of 4 to 12 $\mu$m in the glove box filled with air using an agate mortar. The Li/Ti ratio was obtained by X-ray powder diffraction measurement and chemical analysis. The results are shown in Table 1. It should be noted that the "peak position" in Table 1 refers to the first peak position (angle) of each compound in the X-ray powder diffraction chart. With respect to the values in the table, the strongest peak among the X-ray powder diffraction peaks of the compounds is defined as 100, and the values of the other peaks indicate the relative intensities with respect to the strongest peak. The relative intensities were calculated from the height of each peak. Peaks with a relative intensity of less than 1 were deemed to be not detected.

TABLE 1

| | Presintering | | Results of X-Ray Diffraction Analysis after Presintering (Peak Position and Corresponding Compounds at the Peak Position) | | | | |
|---|---|---|---|---|---|---|---|
| Sample No. | Temperature (° C.) | Li/Ti Ratio | 18° ($Li_4Ti_5O_{12}$) | 27° ($TiO_2$) | 31.5° ($Li_2CO_3$) | 34° ($Li_4Ti_5O_{12}$) | 43.4° ($Li_2TiO_3$) |
| 1-1 | 700 | 0.773 | 39 | 100 | 0 | 0 | 22 |
| 1-2 | 700 | " | " | " | " | " | " |
| 1-3 | 700 | " | " | " | " | " | " |
| 1-4 | 700 | " | " | " | " | " | " |
| 1-5 | 750 | 0.787 | 86 | 100 | 0 | 26 | 24 |
| 1-6 | 750 | " | " | " | " | " | " |
| 1-7 | 750 | " | " | " | " | " | " |
| 1-8 | 750 | " | " | " | " | " | " |
| 1-9 | 800 | 0.690 | 100 | 5 | 0 | 56 | 1 |
| 1-10 | 800 | " | " | " | " | " | " |
| 1-11 | 800 | " | " | " | " | " | " |
| 1-12 | 800 | " | " | " | " | " | " |
| 1-13 | 750 | 0.787 | 86 | 100 | 0 | 26 | 24 |
| 1-14 | 750 | " | " | " | " | " | " |
| 1-15 | 650 | 0.785 | 31 | 100 | 12 | 0 | 15 |
| 1-16 | 650 | " | " | " | " | " | " |
| 1-17 | 650 | " | " | " | " | " | " |
| 1-18 | 650 | " | " | " | " | " | " |

A 100 g portion was taken from the crushed powder and was charged into a titanium die with a diameter of 50 mm, and was then compressed into a plurality of green compacts at a pressure of 0.5 ton/cm$^2$. The green compacts were then inserted into an aluminum reaction tube, and the aluminum reaction tube was inserted into a heating furnace, whereby a sintering process in which the temperature was maintained at 800° C. for 4.5 hours was performed. During this process, oxygen was supplied into the heating furnace at a flow rate in the range of 0.08 to 0.1 Nl/min. The compacts, which were produced in the sintering process, were crushed into a lithium titanate powder in a glove box filled with air using an agate mortar. The Li/Ti ratio was obtained through chemical analysis. The Li/Ti ratios in the temperatures for the presintering process and the sintering process are shown in Table 2. An X-ray powder diffraction measurement was performed on the final product lithium titanate powder, and the $TiO_2$ residual degree was obtained based on the percentage, $I(TiO_2)/I(Li_4Ti_5O_5)$, of the peak intensity of the rutile type $TiO_2$ at 27°, with respect to the peak intensity of the $Li_4Ti_5O_5$ at 18°. The results are shown in Table 2. Table 2 shows that the amount of the residual $TiO_2$ is small as the percentage is small, and highly pure lithium titanate was produced.

TABLE 2

| Sample No. | Presintering Temperature (° C.) | Sintering Temperature (° C.) | Li/Ti Ratio | $TiO_2$ Residual Degree |
|---|---|---|---|---|
| 1-1 | 700 | 800 | 0.798 | 0.06 |
| 1-2 | 700 | 850 | 0.792 | 0.01 |
| 1-3 | 700 | 900 | 0.789 | 0.01 |
| 1-4 | 700 | 950 | 0.790 | 0.01 |
| 1-5 | 750 | 800 | 0.793 | 0.04 |
| 1-6 | 750 | 850 | 0.790 | 0.02 |
| 1-7 | 750 | 900 | 0.790 | 0.01 |
| 1-8 | 750 | 950 | 0.793 | 0.02 |
| 1-9 | 800 | 800 | 0.777 | 0.01 |
| 1-10 | 800 | 850 | 0.778 | 0.01 |
| 1-11 | 800 | 900 | 0.822 | 0 |
| 1-12 | 800 | 950 | 0.800 | 0.01 |
| 1-13 | 750 | 850 | 0.789 | 0.01 |
| 1-14 | 750 | 900 | 0.793 | 0.01 |
| 1-15 | 650 | 800 | 0.706 | 0.04 |
| 1-16 | 650 | 850 | 0.707 | 0.02 |
| 1-17 | 650 | 900 | 0.713 | 0.02 |
| 1-18 | 650 | 950 | 0.709 | 0.02 |
| 1-19 | none | 800 | 0.680 | 0.06 |

Samples Nos. 1-2 to 1-12

The same experimental procedure as that for Sample No. 1-1 was performed, except that the presintering process and the sintering process were performed at the temperatures shown in Table 1. The results are shown in Table 1 and 2.

Sample No. 1-13

291.25 g of titanium dioxide powder with a purity of 99.9% (produced by TOHO TITANIUM Co., Ltd., 90% of rutile rate) and 108.75 g of lithium carbonate with a purity of 99.0% (produced by WAKO JUNYAKU Co., Ltd.) were weighed in a glove box filled with air, and thus a raw material with a Li/Ti ratio of 0.80 was obtained. The average particle sizes of the powders were in the range of 0.1 to 10 μm.

The titanium dioxide powder and the lithium carbonate powder which were weighed were then charged into a rocking mixer and were mixed for 2 hours therein. A 100 g portion was taken from the mixture of the powders and was charged into a titanium die with a diameter of 50 mm and was then compressed into a plurality of green compacts at a pressure of 0.5 ton/cm². The green compacts were then inserted into an aluminum reaction tube with a diameter of 10.5 cm and a length of 100 cm. The aluminum reaction tube was inserted into a heating furnace, whereby a presintering process in which the temperature was maintained at 750° C. for 4.5 hours was performed. Subsequently, the temperature in the furnace was increased, whereby a sintering process in which the temperature was maintained at 850° C. for 10.5 hours was performed. During this process, oxygen was supplied into the heating furnace at a flow rate in the range of 0.08 to 0.1 Nl/min. The compacts produced in the sintering process were crushed into a lithium titanate powder in the glove box filled with air using an agate mortar, thereby yielding a lithium titanate powder. The chemical compositions after the presintering process are shown in Table 1, and the Li/Ti ratio and $TiO_2$ residual degree are shown in Table 2.

Sample No. 1-14

The same experimental procedure as that for Sample No. 1-13 was performed, except that the sintering process was performed at a temperature of 900° C. for 4.5 hours. The results are shown in Tables 1 and 2.

Sample Nos. 1-15 to 1-18

The same experimental procedure as Sample No. 1-1 were performed, except that the presintering process and the sintering process was performed at the temperatures shown in Table 1. The results are shown in Tables 1 and 2.

Sample No. 1-19 (Comparative Sample)

291.25 g of titanium dioxide powder with a purity of 99.9% (produced by TOHO TITANIUM Co., Ltd., 90% of rutile rate) and 108.75 g of lithium carbonate with a purity of 99.0% (produced by WAKO JUNYAKU Co., Ltd.) were weighed in a glove box filled with air, and thus a raw material with a Li/Ti ratio of 0.80 was obtained. The average particle sizes of the powders were in the range of 0.1 to 10 μm.

The titanium dioxide powder and the lithium carbonate powder which were weighed were then charged into a rocking mixer and mixed for 2 hours therein. A 100 g portion was taken from the mixture of the powders and was charged into a titanium die with a diameter of 50 mm, and was then compressed into a plurality of green compacts at a pressure of 0.5 ton/cm². The green compacts were then inserted into an aluminum reaction tube with a diameter of 10.5 cm and a length of 100 cm. The aluminum reaction tube was inserted into a heating furnace, and the temperature in the furnace was increased at a rate of 4° C./min, whereby a sintering process in which the temperature was maintained at 800° C. for 4.5 hours was performed, without the presintering process. During this process, oxygen was supplied into the heating furnace at a flow rate in the range of 0.08 to 0.1 Nl/min. The compacts produced in the sintering process were crushed into a lithium titanate powder in a glove box filled with air using an agate mortar, thereby yielding a lithium titanate powder. The Li/Ti ratio and $TiO_2$ residual degree are shown in Table 2.

As is clearly shown in Tables 1 and 2, in Samples Nos. 1-1 to 1-14 in which the composition consisting of $TiO_2$ and $Li_2TiO_3$ or the composition consisting of $TiO_2$, $Li_2TiO_3$ and $Li_4Ti_5O_{12}$ were produced in the intermediate products after the presintering process, the Li/Ti ratios of the final products, lithium titanate ($Li_4Ti_5O_{12}$), are approximately 0.80, which is the theoretical value, and products having chemical compositions controlled to within the desired value were produced. In contrast, $Li_2CO_3$ as a raw material remained in the intermediate products after the presintering process in Samples Nos. 1-15 to 1-18, and no presintering process was performed in Sample No. 1-19. Therefore, the Li/Ti ratios of the final products of lithium titanate ($Li_4Ti_5O_{12}$) in the samples were approximately 0.70, and the amounts of the lithium components were very low since the lithium component was lost by vaporization, and therefore lithium titanate with a desired composition could not be produced.

2. Second Embodiment

Sample No. 2-1

728.15 g of a titanium dioxide powder with a purity of 99.9% (90% of rutile rate) and 271.85 g of lithium carbonate with a purity of 99.0% were weighed in a glove box filled with argon gas, and thus a raw material with a Li/Ti ratio of 0.80 was obtained. The average particle sizes of these powders were 10 μm.

The titanium dioxide powder and the lithium carbonate powder which were weighed were then charged into a ball mill having a capacity of 5 liters, 1.5 liters of ion exchanged water was further injected, and these were mixed for 2 hours therein. Next, this slurry was dried by evaporation, and a mixture solid of titanium dioxide and lithium carbonate was prepared. A 100 g portion was taken from the mixture solid and was inserted into an aluminum reaction tube with a diameter of 10.5 cm and a length of 100 cm. The aluminum reaction tube was inserted into a heating furnace and the temperature therein was increased at a rate of 4° C./min, whereby a presintering process in which the temperature was maintained at 750° C. for 4.5 hours was performed. During this process, nitrogen gas in which the partial pressure of oxygen gas was 0.005 Pa was supplied into the heating furnace at a flow rate in the range of 0.08 to 0.1 Nl/min.

In order to analyze the composition of intermediate products produced in the presintering process, part of the intermediate product was removed from the heating furnace and was crushed into particles with particle sizes in the range of 4 to 12 μm in air using a porcelain mortar. The Li/Ti ratio was obtained by X-ray powder diffraction measurement and chemical analysis. The results are shown in Table 3. It should be noted that the "peak position" in Table 3 refers to the peak position (angle) of each compound in the X-ray powder diffraction chart. With respect to the values in the Table, the strongest peak among the X-ray powder diffraction peaks of the compounds is defined as 100, and the values of the other peaks indicate the relative intensities with respect to the strongest peak. The relative intensities were calculated from the height of each peak.

TABLE 3

| | Presintering | | Results of X-Ray Diffraction Analysis after Presintering (Peak Position and Corresponding Compounds at the Peak Position) | | | | |
|---|---|---|---|---|---|---|---|
| Sample No. | Temperature (° C.) | Li/Ti Ratio | 18° ($Li_4Ti_5O_{12}$) | 27° ($TiO_2$) | 31.5° ($Li_2CO_3$) | 34° ($Li_4Ti_5O_{12}$) | 43.4° ($Li_2TiO_3$) |
| 2-1 | 750 | 0.790 | 88 | 100 | 0 | 25 | 24 |
| 2-2 | 750 | " | " | " | " | " | " |
| 2-3 | 750 | " | " | " | " | " | " |
| 2-4 | 750 | 0.773 | 39 | 100 | 0 | 0 | 22 |
| 2-5 | 650 | 0.785 | 31 | 100 | 12 | 0 | 15 |
| 2-6 | 650 | " | " | " | " | " | " |
| 2-7 | 650 | " | " | " | " | " | " |
| 2-8 | 650 | " | " | " | " | " | " |
| 2-9 | none | — | — | — | — | — | — |
| 2-10 | 750 | 0.788 | 89 | 100 | 0 | 27 | 23 |

The temperature in the heating furnace in which the intermediate products were inserted was further increased, whereby a sintering process in which the temperature was maintained at 850° C. for 4.5 hours was performed. During this process, nitrogen gas in which the partial pressure of oxygen gas was 0.005 Pa was supplied into the heating furnace at a flow rate in the range of 0.08 to 0.1 Nl/min. The compacts, which were produced in the sintering process, were crushed into a lithium titanate powder in air using a porcelain mortar. The Li/Ti ratio was obtained through chemical analysis. The Li/Ti ratios in the temperatures for the presintering process and the sintering process are shown in Table 4. An X-ray powder diffraction measurement was performed on the final product lithium titanate powder, and the $TiO_2$ residual degree was obtained based on the percentage, $I(TiO_2)/I(Li_4Ti_5O_5)$, of the peak intensity of the rutile type $TiO_2$ at 27°, with respect to the peak intensity of the $Li_4Ti_5O_5$ at 18°. The results are shown in Table 4. Table 4 shows that the amount of the residual $TiO_2$ is small as the percentage is small, and highly pure lithium titanate was produced.

TABLE 4

| Sample No. | Presintering Temperature (° C.) | Sintering Temperature (° C.) | Li/Ti Ratio | $TiO_2$ Residual Degree |
|---|---|---|---|---|
| 2-1 | 750 | 850 | 0.790 | 0.02 |
| 2-2 | 750 | 900 | 0.791 | 0.01 |
| 2-3 | 750 | 950 | 0.793 | 0.02 |
| 2-4 | 750 | 850 | 0.793 | 0.01 |
| 2-5 | 650 | 800 | 0.706 | 0.04 |
| 2-6 | 650 | 850 | 0.707 | 0.02 |
| 2-7 | 650 | 900 | 0.713 | 0.02 |
| 2-8 | 650 | 950 | 0.709 | 0.02 |
| 2-9 | None | 800 | 0.680 | 0.06 |
| 2-10 | 750 | 850 | 0.789 | 0.01 |

Sample No. 2-2

The same experimental procedure as that for Sample No. 2-1 was performed, except that the sintering process was performed at a temperature of 900° C. The results are shown in Tables 3 and 4.

Sample No. 2-3

The same experimental procedure as that for Sample No. 2-1 was performed, except that the sintering process was performed at a temperature of 950° C. The results are shown in Tables 3 and 4.

Sample No. 2-4

The same experimental procedure as that for Sample No. 2-1 was performed, except that dry-type mixing was performed instead of the use of ion exchanged water in the mixing of titanium dioxide powder and lithium carbonate powder, and then the presintering process was performed. The compositions after the sintering process are shown in Table 3, and the Li/Ti ratios and the $TiO_2$ residual degrees of the yielded lithium titanate powders are shown in Table 4.

Sample Nos. 2-5 to 2-8

The same experimental procedures as for Sample No. 2-1 were performed, except that the presintering process and the sintering process were performed at the temperatures shown in Table 3. The results are shown in Tables 3 and 4.

Sample No. 2-9 (Comparative Sample)

291.25 g of titanium dioxide powder with a purity of 99.9% (produced by TOHO TITANIUM Co., Ltd., 90% of rutile rate) and 108.75 g of lithium carbonate with a purity of 99.0% (produced by WAKO JUNYAKU Co., Ltd.) were weighed in a glove box filled with argon gas, and thus a raw material with a Li/Ti ratio of 0.80 was yielded. The average particle sizes of the powders were in the range of 0.1 to 10 μm.

The titanium dioxide powder and the lithium carbonate powder which were weighed were then charged into a rocking mixer and were mixed for 2 hours therein. A 100 g portion was taken from the mixture of the powders and was charged into a titanium die with a diameter of 50 mm and was then compressed into a plurality of green compacts at a pressure of 0.5 ton/cm². The green compacts were then inserted into an aluminum reaction tube with a diameter of 10.5 cm and a length of 100 cm. The aluminum reaction tube was inserted into a heating furnace, and the temperature in the furnace was increased at an average rate of temperature increase of 4° C./min, whereby a sintering process in which the temperature was maintained at 800° C. for 4.5 hours was performed without a presintering process. During this process, oxygen was supplied into the heating furnace at a flow rate in the range of 0.08 to 0.1 Nl/min. The compacts produced in the sintering process were crushed into a lithium titanate powder in air using a porcelain mortar, thereby yielding a lithium titanate powder. The Li/Ti ratio and $TiO_2$ residual degree of the yielded lithium titanate powders are shown in Table 4.

Sample No. 2-10

The same experimental procedure as that for Sample No. 2-4 was performed, except that oxygen was supplied into the heating furnace at a flow rate in the range of 0.08 to 0.1 Nl/min during the presintering process and the sintering process. The compositions after the sintering process are shown in Table 3, and the Li/Ti ratios and the $TiO_2$ residual degrees of the yielded lithium titanate powders are shown in Table 4.

As is clearly shown in Tables 3 and 4, in Samples Nos. 2-1 to 2-4 in which the composition consisting of $TiO_2$ and $Li_2TiO_3$ or the composition consisting of $TiO_2$, $Li_2TiO_3$ and $Li_4Ti_5O_{12}$ were produced in the intermediate products after the presintering process, the Li/Ti ratios of the final products, lithium titanate ($Li_4Ti_5O_{12}$), are approximately 0.80, which is the theoretical value, and products having chemical compositions controlled to within the desired value were produced. In contrast, $Li_2CO_3$ as a raw material remained in the intermediate products after the presintering process in Samples Nos. 2-5 to 2-8, and no presintering process was performed in Sample No. 2-9. Therefore, the Li/Ti ratios of the final products of lithium titanate ($Li_4Ti_5O_{12}$) in the samples were approximately 0.70, and the amounts of the lithium components were very low since the lithium component was lost by vaporization, and therefore lithium titanate with a desired composition could not be produced.

Evaluation of Lithium Ion Battery Property

With respect to lithium titanate produced in Sample Nos. 2-1 and 2-10, lithium ion battery property was evaluated under the following conditions.

Production of Negative Electrode:

Lithium titanate powder, acetylene black, and polytetrafluoroethylene were mixed at a weight ratio of 8:1:1 and were compacted, then they were dried under reduced pressure at 200° C. for 12 hours, and a negative electrode was thereby produced.

Production of Battery for Evaluating:

A counter electrode which is a positive electrode was made of lithium-aluminum alloy, and a reference electrode was made of lithium foil. As a separator, a polyethylene pore film was used, and as an electrolyte, $LiPF_6$ dissolved in a mixture solvent consisting of propylene carbonate, ethylene carbonate, and 1, 2-dimethoxyethane at a concentration of 1 mol/dm³ was used.

Measurement of Charge-Discharge Capacity:

Charging was performed at a current density of 1 mA/cm² until the potential reached 2.5 V, and discharging was performed at the same current density until the potential reached 1.2 V This charge-discharge operation was repeatedly carried out, and the discharge capacity and the coulomb efficiency were calculated from the obtained charge-discharge curve. The results are shown in Table 5.

TABLE 5

| | Sample No. 2-1 | | Sample No. 2-10 | |
|---|---|---|---|---|
| Cycles | Charge-Discharge Capacity (mAh/g) | Coulomb Efficiency (%) | Charge-Discharge Capacity (mAh/g) | Coulomb Efficiency (%) |
| 1 | 121 | 93 | 104 | 81 |
| 2 | 128 | 99 | 124 | 95 |
| 3 | 129 | 102 | 124 | 101 |
| 4 | 126 | 98 | 108 | 99 |
| 5 | 125 | 99 | 108 | 98 |
| 6 | 124 | 100 | 108 | 98 |
| 7 | 124 | 100 | 107 | 97 |
| 8 | 125 | 100 | 106 | 96 |
| 9 | 125 | 100 | 104 | 95 |
| 10 | 125 | 100 | 105 | 95 |
| 11 | 125 | 100 | 103 | 95 |
| 12 | 125 | 100 | 106 | 96 |
| 13 | 125 | 100 | 103 | 96 |
| 14 | 125 | 100 | 98 | 96 |
| 15 | 125 | 100 | 103 | 95 |
| 16 | 125 | 100 | 108 | 94 |
| 17 | 125 | 100 | 109 | 95 |
| 18 | 125 | 100 | 109 | 95 |

As is apparent from Table 5, according to a lithium ion battery in which lithium titanate of the present invention was used as a negative electrode, the discharge capacity was large, the discharge capacity and the coulomb efficiency are not lowered and are greatly stabilized, even if charge-discharge operation is repeatedly carried out, and the charge-discharge cycle property is therefore extremely superior.

3. Third Embodiment
Sample No. 3-1

728.15 g of a titanium dioxide powder with a purity of 99.9% (90% of rutile rate) and 271.85 g of lithium carbonate with a purity of 99.0% were weighed in a glove box filled with argon gas, and thus a raw material with a Li/Ti ratio of 0.80 was obtained. The average particle sizes of these powders were 10 μm.

The titanium dioxide powder and the lithium carbonate powder which were weighed were then charged into a ball mill having a capacity of 5 liters, 1.5 liters of ion exchanged water was further injected, and the lithium compound solution was therefore prepared and was mixed for 2 hours. Next, this slurry was dried by evaporation, and a mixture solid of titanium dioxide and lithium carbonate was prepared. A 100 g portion was taken from the mixture solid and was inserted into an aluminum reaction tube with a diameter of 10.5 cm and a length of 100 cm. The aluminum reaction tube was inserted into a heating furnace and the temperature therein was increased at a rate of 4° C./min, whereby a presintering process in which the temperature was maintained at 750° C. for 4.5 hours was performed. During this process, nitrogen gas in which the partial pressure of oxygen gas was 0.005 Pa was supplied into the heating furnace at a flow rate in the range of 0.08 to 0.1 Nl/min.

In order to analyze the composition of intermediate products produced in the presintering process, part of the intermediate product was removed from the heating furnace and was crushed into particles with particle sizes in the range of 4 to 12 μm in air using a porcelain mortar. The Li/Ti ratio was obtained by X-ray powder diffraction measurement and chemical analysis. The results are shown in Table 6. It should be noted that the "peak position" in Table 6 refers to the peak position (angle) of each compound in the X-ray powder diffraction chart. With respect to the values in the Table, the strongest peak among the X-ray powder diffraction peaks of the compounds is defined as 100, and the values of the other peaks indicate the relative intensities with respect to the strongest peak. The relative intensities were calculated from the height of each peak.

The temperature in the heating furnace in which the intermediate products were inserted was further increased, whereby a sintering process in which the temperature was maintained at 900° C. for 4.5 hours was performed. During this process, nitrogen gas in which the partial pressure of oxygen gas was 0.005 Pa was supplied into the heating furnace at a flow rate in the range of 0.08 to 0.1 Nl/min. The compacts, which were produced in the sintering process, were crushed into a lithium titanate powder in air using a porcelain mortar. The Li/Ti ratio was obtained through chemical analysis. The Li/Ti ratios in the temperatures for the presintering process and the sintering process are shown in Table 7. An X-ray powder diffraction measurement was performed on the final product lithium titanate powder, and the $TiO_2$ residual degree was obtained based on the percentage, $I(TiO_2)/I(Li_4Ti_5O_5)$, of the peak intensity of the rutile type $TiO_2$ at 27°, with respect to the peak intensity of the $Li_4Ti_5O_5$ at 18°. The results are shown in Table 7. Table 7 shows that the amount of the residual $TiO_2$ is small as the percentage is small, and highly pure lithium titanate was produced.

TABLE 7

| Sample No. | Presintering Temperature (° C.) | Sintering Temperature (° C.) | Li/Ti Ratio | $TiO_2$ Residual Degree |
|---|---|---|---|---|
| 3-1 | 750 | 900 | 0.791 | 0.01 |
| 3-2 | 750 | 950 | 0.793 | 0.02 |
| 3-3 | 750 | 900 | 0.780 | 0.01 |
| 3-4 | 650 | 800 | 0.706 | 0.04 |
| 3-5 | 650 | 850 | 0.707 | 0.02 |
| 3-6 | 650 | 900 | 0.713 | 0.02 |
| 3-7 | 650 | 950 | 0.709 | 0.02 |
| 3-8 | None | 800 | 0.680 | 0.06 |
| 3-9 | 750 | 900 | 0.781 | 0.13 |

Sample No. 3-2

The same experimental procedure as that for Sample No. 3-1 was performed, except that the sintering process was performed at a temperature of 950° C. The results are shown in Tables 6 and 7.

Sample No. 3-3

The same experimental procedure as that for Sample No. 3-1 was performed, except that oxygen was supplied into the heating furnace at a flow rate in the range of 0.08 to 0.1 Nl/min during the presintering process and the sintering process. The compositions after the sintering process are shown in Table 6, and the Li/Ti ratios and the $TiO_2$ residual degrees of the yielded lithium titanate powders are shown in Table 7.

TABLE 6

| | Presintering | | Results of X-Ray Diffraction Analysis after Presintering (Peak Position and Corresponding Compounds at the Peak Position) | | | | |
|---|---|---|---|---|---|---|---|
| Sample No. | Temperature (° C.) | Li/Ti Ratio | 18° ($Li_4Ti_5O_{12}$) | 27° ($TiO_2$) | 31.5° ($Li_2CO_3$) | 34° ($Li_4Ti_5O_{12}$) | 43.4° ($Li_2TiO_3$) |
| 3-1 | 750 | 0.790 | 88 | 100 | 0 | 25 | 24 |
| 3-2 | 750 | " | " | " | " | " | " |
| 3-3 | 750 | 0.788 | 89 | 100 | 0 | 27 | 23 |
| 3-4 | 650 | 0.785 | 31 | 100 | 12 | 0 | 15 |
| 3-5 | 650 | " | " | " | " | " | " |
| 3-6 | 650 | " | " | " | " | " | " |
| 3-7 | 650 | " | " | " | " | " | " |
| 3-8 | none | — | — | — | — | — | — |
| 3-9 | 750 | 0.787 | 86 | 100 | 0 | 26 | 24 |

Sample Nos. 3-4 to 3-7

The same experimental procedure as Sample No. 3-1 were performed, except that the presintering process and the sintering process was performed at the temperatures shown in Table 6. The results are shown in Tables 6 and 7.

Sample No. 3-8 (Comparative Sample)

291.25 g of titanium dioxide powder with a purity of 99.9% (produced by TOHO TITANIUM Co., Ltd., 90% of rutile rate) and 108.75 g of lithium carbonate with a purity of 99.0% (produced by WAKO JUNYAKU Co., Ltd.) were weighed in a glove box filled with argon gas, and thus a raw material with a Li/Ti ratio of 0.80 was yielded. The average particle sizes of the powders were in the range of 0.1 to 10 $\mu$m.

The titanium dioxide powder and the lithium carbonate powder which were weighed were then charged into a rocking mixer and were mixed for 2 hours therein. A 100 g portion was taken from the mixture of the powders and was charged into a titanium die with a diameter of 50 mm and was then compressed into a plurality of green compacts at a pressure of 0.5 ton/cm$^2$. The green compacts were then inserted into an aluminum reaction tube with a diameter of 10.5 cm and a length of 100 cm. The aluminum reaction tube was inserted into a heating furnace, and the temperature in the furnace was increased at an average rate of temperature increase of 4° C./min, whereby a sintering process in which the temperature was maintained at 800° C. for 4.5 hours was performed without a presintering process. During this process, oxygen was supplied into the heating furnace at a flow rate in the range of 0.08 to 0.1 Nl/min. The compacts produced in the sintering process were crushed into a lithium titanate powder in air using a porcelain mortar, thereby yielding a lithium titanate powder. The Li/Ti ratio and $TiO_2$ residual degree of the yielded lithium titanate powders are shown in Table 7.

Sample No. 3-9

728.15 g of a titanium dioxide powder with a purity of 99.9% (90% of rutile rate) and 271.85 g of lithium carbonate with a purity of 99.0% were weighed in a glove box filled with argon gas, and thus a raw material with a Li/Ti ratio of 0.80 was obtained. The average particle sizes of these powders were 10 $\mu$m. The titanium dioxide powder and the lithium carbonate powder which were weighed were then charged into a ball mill having a capacity of 5 liters, and were mixed for 2 hours therein without ion exchanged water. A 100 g portion was taken from the mixture and was inserted into an aluminum reaction tube with a diameter of 10.5 cm and a length of 100 cm. The aluminum reaction tube was inserted into a heating furnace and the temperature therein was increased at a rate of 4° C./min, whereby a presintering process in which the temperature was maintained at 750° C. for 4.5 hours was performed. During this process, oxygen gas was supplied into the heating furnace at a flow rate in the range of 0.08 to 0.1 Nl/min. With respect to the yielded powder as described above, the Li/Ti ratio was obtained by X-ray powder diffraction measurement and chemical analysis. The results are shown in Table 6.

Then the temperature in the heating furnace was further increased, whereby a sintering process in which the temperature was maintained at 900° C. for 4.5 hours was performed. During this process, oxygen gas was supplied into the heating furnace at a flow rate in the range of 0.08 to 0.1 Nl/min. The compacts, which were produced in the sintering process, were crushed into a lithium titanate powder in air using an agate mortar. The Li/Ti ratio was obtained through chemical analysis. The Li/Ti ratios in the temperatures for the presintering process and the sintering process are shown in Table 7.

As is clearly shown in Tables 6 and 7, in Samples Nos. 3-1 to 3-2 in which the lithium compound powder and the titanium dioxide powder were mixed using solvent, the composition consisting of $TiO_2$ and $Li_2TiO_3$ or the composition consisting of $TiO_2$, $Li_2TiO_3$ and $Li_4Ti_5O_{12}$ were produced in the intermediate products after the presintering process, the Li/Ti ratios of the final products, lithium titanate ($Li_4Ti_5O_{12}$), are approximately 0.80, which is the theoretical value, and products having chemical compositions controlled to within the desired value were produced. In Sample No. 3-3, the Li/Ti ratio was slightly lowered since the oxygen was supplied during the presintering process and the sintering process. In contrast, $Li_2CO_3$ as a raw material remained in the intermediate products after the presintering process in Samples Nos. 3-4 to 3-7, and no presintering process was performed in Sample No. 3-8. Therefore, the Li/Ti ratios of the final products of lithium titanate ($Li_4Ti_5O_{12}$) in the samples were approximately 0.70, and the amounts of the lithium components were very low since the lithium component was lost by vaporization, and therefore lithium titanate with a desired composition could not be produced. In addition, in Sample No. 3-9 in which lithium compound and titanium dioxide were mixed without using solvent, the $TiO_2$ residual degree was higher than Sample Nos. 3-1 and 3-2 and the purity of the yielded lithium titanate powder was low.

As described above, according to the process for producing lithium titanate of the invention, a mixture of titanium dioxide and lithium compounds are presintered to yield a composition consisting of $TiO_2$ and $Li_2TiO_3$ or a composition consisting of $TiO_2$, $Li_2TiO_3$ and $Li_4Ti_5O_{12}$, the composition is then sintered, and vaporization loss of the lithium component can be suppressed, the desired Li/Ti ratio can be obtained, and therefore lithium titanate with superior properties for, for example, secondary lithium batteries, can be produced.

What is claimed is:

1. A process for producing lithium titanate, comprising:
   presintering a mixture of titanium dioxide and at least one lithium compound selected from the group consisting of lithium carbonate, lithium hydroxide, lithium nitrate, and lithium oxide, for a duration of 30 minutes to 4 hours at a temperature of at least 600° C. and less than 800° C., to yield at least one of a composition comprising $TiO_2$ and $Li_2TiO_3$ and a composition comprising $TiO_2$, $Li_2TiO_3$ and $Li_4Ti_5O_{12}$; and
   separately sintering the composition at a temperature of from 800° C. to 950° C. in an atmosphere in which the partial pressure of oxygen gas is not more than 1 Pa.

2. A process for producing lithium titanate according to claim 1, wherein the presintering is performed at a temperature of between more than 670° C. and less than 800° C.

3. A process for producing lithium titanate according to claim 1, wherein a powder of the lithium compound and a powder of the titanium dioxide are mixed, compacted into a green compact, the green compact is presintered, the presintered compact is ground, and then, the resulting pieces of the presintered compact is re-compacted and sintered.

4. A process for producing lithium titanate according to claim 1, wherein a powder of the lithium compound and a powder of the titanium dioxide are mixed and compacted, the resulting green compact is presintered, and sintered after the temperature is raised.

5. A process for producing lithium titanate according to claim 1, wherein the sintering is carried out in an atmosphere in which the partial pressure of oxygen gas is not more than 0.1 Pa.

6. A negative electrode for a lithium ion battery comprising lithium titanate produced according to the process of claim 1.

7. A lithium ion battery having a negative electrode or a positive electrode comprising the lithium titanate produced according to the process of claim 1.

8. A process for producing lithium titanate, comprising:
presintering a mixture of titanium dioxide and at least one lithium compound selected from the group consisting of lithium carbonate, lithium hydroxide, lithium nitrate, and lithium oxide for a duration of 30 minutes to 4 hours at a temperature of at least 600° C. and less than 800° C., to yield at least one of a composition comprising $TiO_2$ and $Li_2TiO_3$ and a composition comprising $TiO_2$, $Li_2TiO_3$ and $Li_4Ti_5O_{12}$; and
separately sintering the composition at a temperature of from 800° C. to 950° C., wherein the mixture is prepared by forming a lithium compound solution by mixing the at least one lithium compound and a solvent, thereafter mixing the titanium dioxide into the lithium compound solution, and subsequently drying and sintering the mixture.

9. A process for producing lithium titanate according to claim 8, wherein the presintering is performed at a temperature of between more than 670° C. and less than 800° C.

10. A process for producing lithium titanate according to claim 8, wherein a powder of the lithium compound and a powder of the titanium dioxide are mixed, compacted into a green compact, the green compact is presintered, the presintered compact is ground, and then, the resulting pieces of the presintered compact is re-compacted and sintered.

11. A process for producing lithium titanate according to claim 8, wherein a powder of the lithium compound and a powder of the titanium dioxide are mixed and compacted, the resulting green compact is presintered, and sintered after the temperature is raised.

12. A process for producing lithium titanate according to claim 8, wherein the solvent is selected from water, alcohols, and mixture thereof.

13. A negative electrode for a lithium ion battery comprising lithium titanate produced according to the process of claim 8.

14. A lithium ion battery having a negative electrode or a positive electrode comprising the lithium titanate produced according to the process of claim 8.

15. A process for producing lithium titanate, comprising:
presintering a mixture of titanium dioxide and at least one lithium compound selected from the group consisting of lithium carbonate, lithium hydroxide, lithium nitrate, and lithium oxide for a duration of 30 minutes to 4 hours at a temperature of at least 600° C. and less than 800° C., to yield at least one of a composition comprising $TiO_2$ and $Li_2TiO_3$ and a composition comprising $TiO_2$, $Li_2TiO_3$ and $Li_4Ti_5O_{12}$; and
separately sintering the composition at a temperature of from 800° C. to 950° C. in an atmosphere in which the partial pressure of oxygen gas is not more than 1 Pa, wherein the mixture is prepared by forming a lithium compound solution by mixing the at least one lithium compound and a solvent, thereafter mixing the titanium dioxide into the lithium compound solution, and subsequently drying and sintering the mixture.

16. A process for producing lithium titanate according to claim 15, wherein the presintering is performed at a temperature of between more than 670° C. and less than 800° C.

17. A process for producing lithium titanate according to claim 15, wherein a powder of the lithium compound and a powder of the titanium dioxide are mixed, compacted into a green compact, the green compact is presintered, the presintered compact is ground, and then, the resulting pieces of the presintered compact is re-compacted and sintered.

18. A process for producing lithium titanate according to claim 15, wherein a powder of the lithium compound and a powder of the titanium dioxide are mixed and compacted, the resulting green compact is presintered, and sintered after the temperature is raised.

19. A process for producing lithium titanate according to claim 15, wherein the sintering is carried out in an atmosphere in which the partial pressure of oxygen gas is not more than 0.1 Pa.

20. A process for producing lithium titanate according to claim 15, wherein the solvent is selected from water, alcohols, and mixture thereof.

21. A negative electrode for a lithium ion battery comprising lithium titanate produced according to the process of claim 15.

22. A lithium ion battery having a negative electrode or a positive electrode comprising the lithium titanate produced according to the process of claim 15.

* * * * *